US007733507B2

(12) United States Patent
Toumanova et al.

(10) Patent No.: US 7,733,507 B2
(45) Date of Patent: Jun. 8, 2010

(54) PRINTER DRIVER WITH AUTOMATIC TEMPLATE GENERATION

(75) Inventors: Veronica Toumanova, Venlo (NL); Bastiaan J. Hermus, Eindhoven (NL); Ronald R. F. Dongelmans, Nijmegen (NL); Anita C. Morskate, Venlo (NL); Robert L. A. H. Van Vonderen, Venray (NL); Fredrik De Jong, Swalmen (NL)

(73) Assignee: Oce-Technologies, B.V., Venlo (NL)

( * ) Notice: Subject to any disclaimer, the term of this patent is extended or adjusted under 35 U.S.C. 154(b) by 1517 days.

(21) Appl. No.: 11/037,290

(22) Filed: Jan. 19, 2005

(65) Prior Publication Data

US 2005/0162677 A1   Jul. 28, 2005

(30) Foreign Application Priority Data

Jan. 23, 2004   (EP) .................................. 04075139

(51) Int. Cl.
*G06F 15/00* (2006.01)
*G06F 3/12* (2006.01)
(52) U.S. Cl. ..................................... 358/1.13; 358/1.15
(58) Field of Classification Search .................. 358/1.1, 358/1.8, 1.9, 1.13, 1.14, 1.15, 1.16, 1.18, 358/448, 402, 474, 400
See application file for complete search history.

(56) References Cited

U.S. PATENT DOCUMENTS

| 6,147,767 | A   | 11/2000 | Petteruti et al. ............ 358/1.18 |
| 7,102,765 | B1* | 9/2006  | Abi-Saleh et al. .......... 358/1.13 |
| 7,133,141 | B1* | 11/2006 | Abi-Saleh ................... 358/1.13 |
| 2003/0112456 | A1* | 6/2003 | Tomita et al. .............. 358/1.13 |
| 2003/0151760 | A1* | 8/2003 | Berndt et al. .............. 358/1.14 |

FOREIGN PATENT DOCUMENTS

| JP | 10-325167 A     | 10/1998 |
| JP | 2001-18496 A    | 1/2001  |
| JP | 2001-350606 A   | 12/2001 |
| JP | 2003-303081 A   | 10/2003 |
| WO | WO 01/63381 A   | 8/2001  |
| WO | WO-02/075643 A1 | 9/2002  |

OTHER PUBLICATIONS

"Proposal to configure a printer driver for customized formatting/finishing or print jobs", Anonymous Research Disclosure, Sep. 2001 p. 449055.

* cited by examiner

*Primary Examiner*—Gabriel I Garcia
(74) *Attorney, Agent, or Firm*—Birch, Stewart, Kolasch & Birch, LLP

(57) ABSTRACT

A method of printing documents from a user workstation includes activating a printer driver for submitting a digital document file to a printer, specifying print process settings in the printer driver, and commanding the driver to submit the document file and the settings to the printer. Values of settings are either individually or collectively specified, and a collective specification is a selection of a user-selectable prestored set of settings, called a "template". Each time a value of at least one of a predetermined set of settings is individually specified and confirmed by a user, a new template is automatically defined and made selectable in the printer driver. A new template can be renamed by the user for easy recognition. Also, a template can easily be deleted, such that the number of templates can be kept practical. The same template management method can be used for other document-related processes, such as faxing and scanning.

36 Claims, 7 Drawing Sheets

PRINTER DRIVER WITH AUTOMATIC TEMPLATE GENERATION

This application claims priority under 35 U.S.C. §119 of European Patent Application No. 04075139.8, the entire contents of which are hereby incorporated by reference.

BACKGROUND OF THE INVENTION

1. Field of the Invention

The invention pertains to a method of printing documents from a user workstation, and also relates to a printer driver, a computer program implementing the method of the invention and a computer-readable medium carrying computer code for performing the method.

2. Description of the Related Art

Printing documents from a user workstation is a multi-step process that includes, activating a printer driver for submitting a digital document file to a printer, specifying print process settings in the printer driver, and commanding the driver to submit the document file and the settings to the printer. In the printing process, values of settings are either individually or collectively specified, and a collective specification is a selection of a user-selectable pre-stored set of settings, which is referred to as a "template".

A related art method of this type of printing process is typified by a publication in Research Disclosure of September 2001, p. 1506, ref. no. 449055: "Proposal To Configure A Printer Driver For Customized Formatting/Finishing Of Print Jobs." According to this publication, a printer driver window includes multiple predefinable buttons, each associated with a set of settings values. By clicking such a predefined button, the user applies all associated settings values at once. Individual resetting may then still change these values. Buttons may be predefined by a user or be downloaded from a central server.

Although such pre-programmed buttons (or "templates"), add to the convenience of a user by providing fast and consistent programming of print settings for a small number of standard print formats, every new format a user wants to use must be programmed and stored in advance. In practice, however, a user frequently introduces a new format during the process of printing and forgets to save it in advance. When the print command has been given, the printer driver disappears and if the user wants to apply the new settings again, she has to reprogram the driver again.

SUMMARY OF THE INVENTION

An object of the invention is to overcome the disadvantages of the related art.

The invention has the object to improve the known method/printer driver in such a way that a user can re-use an amended set of print settings for a new print job with minimal effort.

The invention, in part, pertains to a method of outputting or printing documents from a user workstation, which includes: activating a printer driver for submitting a digital document file to a printer, specifying print process settings in the printer driver such that values of settings are either individually or collectively specified, a collective specification being a selection of a user-selectable prestored set of settings that is a template, and each time a value of at least one of a predetermined set of settings is individually specified and confirmed by a user, a new template is automatically defined and made selectable in the printer driver, and commanding the driver to submit the document file and the settings to the printer.

In the invention, a new template may not be defined if it does not differ, in the predetermined set of settings, from an already existing template. An individual specification of a setting value can include changing the value in a template. The method can further include allowing a user to define a name for a template and allowing a user to delete a template. The method can include at least one pre-defined template that can never be deleted by a user. The invention can present templates in a selection window on the workstation display screen, and the invention can present a summary of values of a plurality of settings in accordance with a selected template in a window on the workstation display screen. The invention can also present a summary of values of multiple settings in accordance with currently specified settings in a window on the workstation display screen.

The invention, in part, pertains to a printer driver for use in a workstation such as a PC for printing document files to a printer, which includes a data processing section for processing document data and submitting the processed document data to a printer, and a graphical user interface section for communication with a user by presenting information on the display screen of the workstation. The printer driver is laid out for implementing the inventive method.

The invention, in part, pertains to a computer program using computer code implementing the inventive method when executed in a computer. A computer-readable medium carrying computer code implements the inventive method.

The invention, in part, which includes activating a driver for submitting a file to an output device, specifying process settings in the driver such that values of settings are either individually or collectively specified, a collective specification being a selection of a user-selectable prestored set of settings that is a template, and each time a value of at least one of a predetermined set of settings is individually specified and confirmed by a user, a new template is automatically defined and made selectable in the driver, and commanding the driver to submit the document file and the settings to the output device.

In a further embodiment, newly-defined templates are not immediately permanent, but may be made so by a save action of the user. Renaming a new template, which implicitly indicates that the user wants to maintain it, automatically makes that template permanent as well.

Templates that have not been made permanent by the user are maintained on a first in-first out basis, such as not to exceed a number of N. N will normally be a predetermined small number, e.g. smaller than 4, preferably 1. Alternatively, the value of N is configurable for the user. In this way, the number of templates can easily be kept surveyable for the user.

It is to be understood that both the foregoing general description and the following detailed description are exemplary and explanatory and are intended to provide further explanation of the invention as claimed.

BRIEF DESCRIPTION OF THE DRAWINGS

These and other aspects of the invention will be apparent from and elucidated further with reference to the embodiments described by way of example in the following description and with reference to the accompanying drawings, in which.

DETAILED DESCRIPTION

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
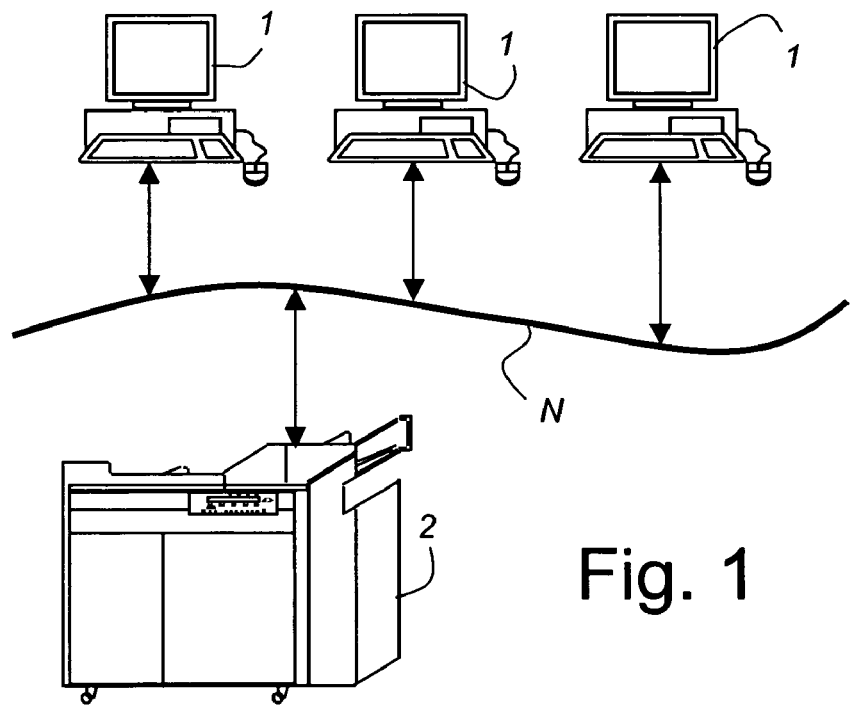
FIG. 1 shows a network system of workstations and printers.

FIG. 1 shows a system of workstations (1) and at least one printer (2) connected by a local network (N). Workstations, for example, are PC's equipped with a processor unit, a monitor, a keyboard and a mouse or other indicator instrument. The term "printer" includes a digital copying machine in this context. Users who wish to have a specific data file printed from their workstation can choose from one printer, multiple printers or even from all the printers in the system.

In order to be able to send a print file to a printer, a workstation must include a program, called "printer driver." A printer driver program is logically coupled via the network N to one of the printers. When the user has access to multiple printers, her workstation contains a printer driver for each one.

Figure 2:
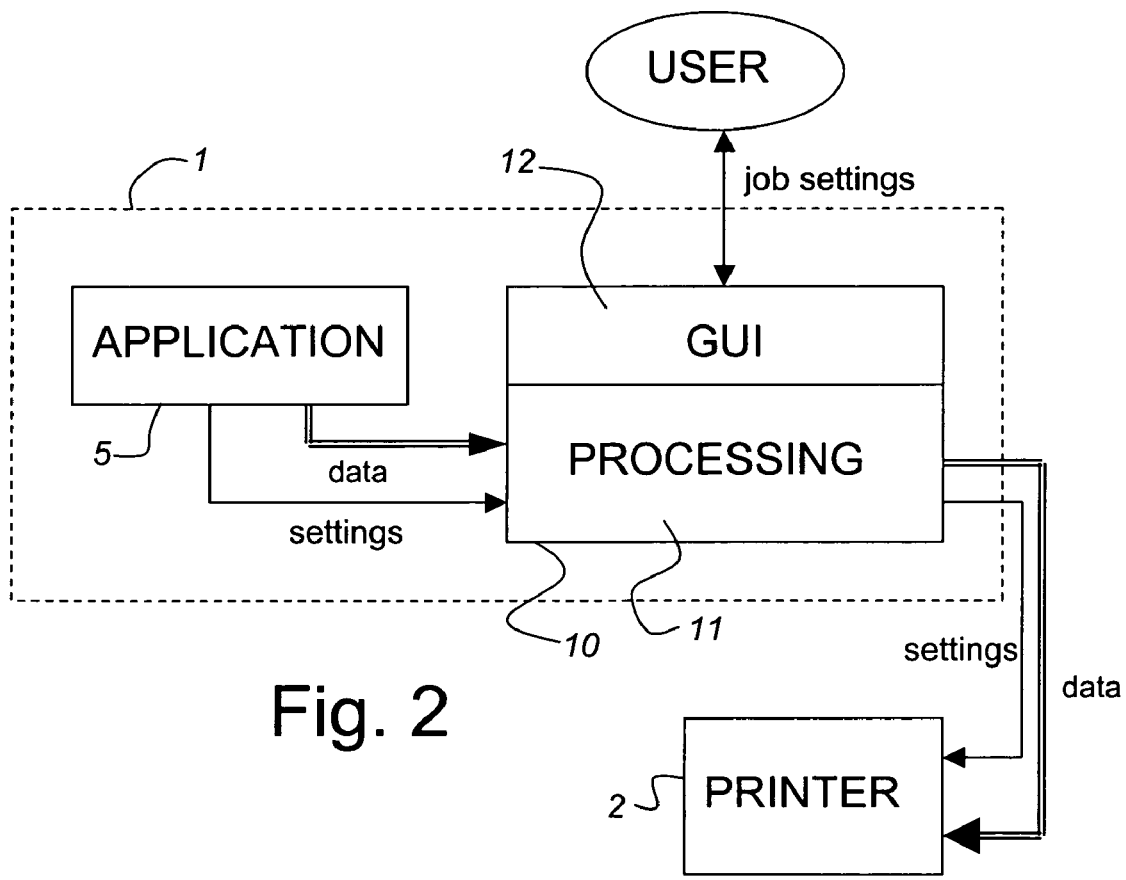
FIG. 2 shows a schematic functional view of a system according to the present invention.

FIG. 2 shows a schematic functional view of a system of a user workstation 1 and a printer 2. The workstation 1 includes an application program 5 for producing files for printing, such as a document editor, and a printer driver program 10.

When a user wants to print a print job, she calls up the printer driver, for example by clicking the corresponding icon in the application window on her display screen. Alternatively, the printer driver may be called up via the print service of the operating system. For example, in MS Windows the print service is activated via the File menu and a job specification window may be opened by clicking the "Properties" window. However, the invention does not apply only to MS Windows applications, but can be used by any appropriate operating system, such as Apple, Linux, etc.

As shown schematically in FIG. 2, the printer driver program 10 includes a data processing portion 11 for reformatting the image data from the application program 5 into print data usable by the printer 2 (generally in a page description language such as Postscript) and for handling system management information. The printer driver program 10 also includes a user interface portion 12 (graphic user interface—GUI) for communicating with the user.

Upon activation, the printer driver user interface portion 12 opens a job specification window on the workstation display screen, into which the user can input specifications for the intended print job, such as the number of copies, single or double sided printing, and so on. The user may select job settings or accept the pre-selected default settings. Some of the settings may already be selected by or with the application. Finally, the user must activate (click) a print button in the driver window. In response, the printer driver renders the print data and sends them, together with the job settings, to the printer 2 via the network (not shown in FIG. 2).

Additionally, the printer 2 sends status information back to the printer driver 10, which presents such status information to the user via the user interface 12.

Figure 3:
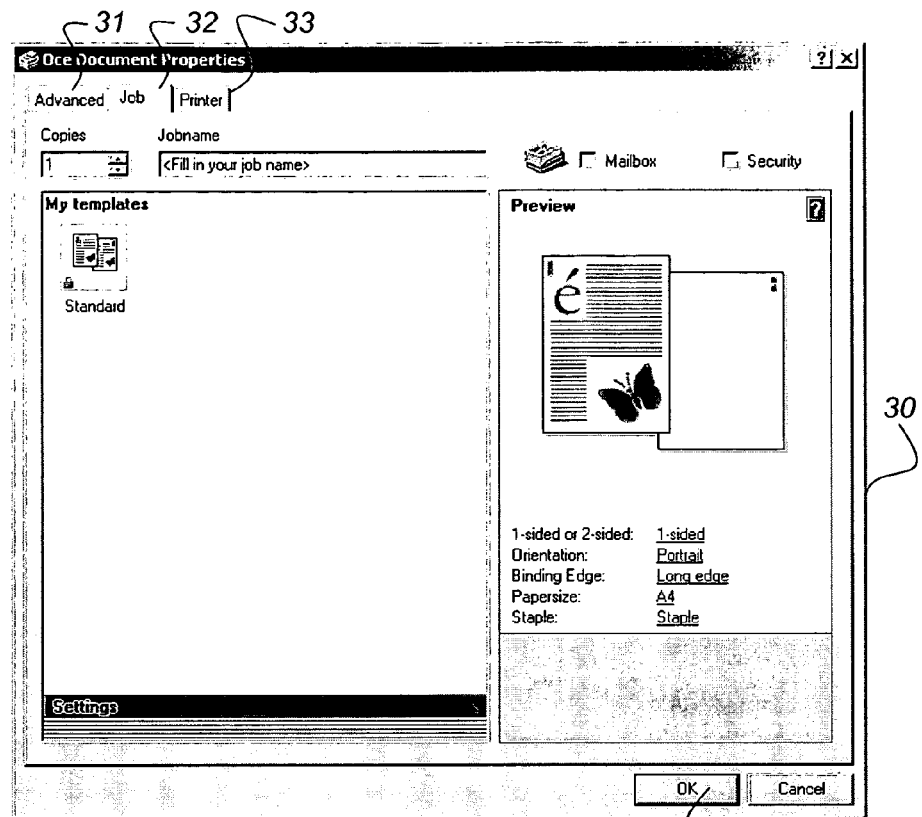
FIG. 3 shows a job specification window of a printer driver according to the invention.

FIG. 3 shows a job specification window 30 of a printer driver according to an embodiment of the invention. The window includes three tab sheets 31, 32, 33 that are placed on top of each other and are selectable by clicking on the relevant tab. The tab sheet shown in FIG. 3 is the "Job" tab 32. This tab sheet 32 is dedicated defining a new print job. The other tab sheets include "Printer" for system and status information of the printer device, and "Advanced" for specifying detailed settings such as font selection and pdl interpreter control, which are normally not used in job specification.

Figure 4:
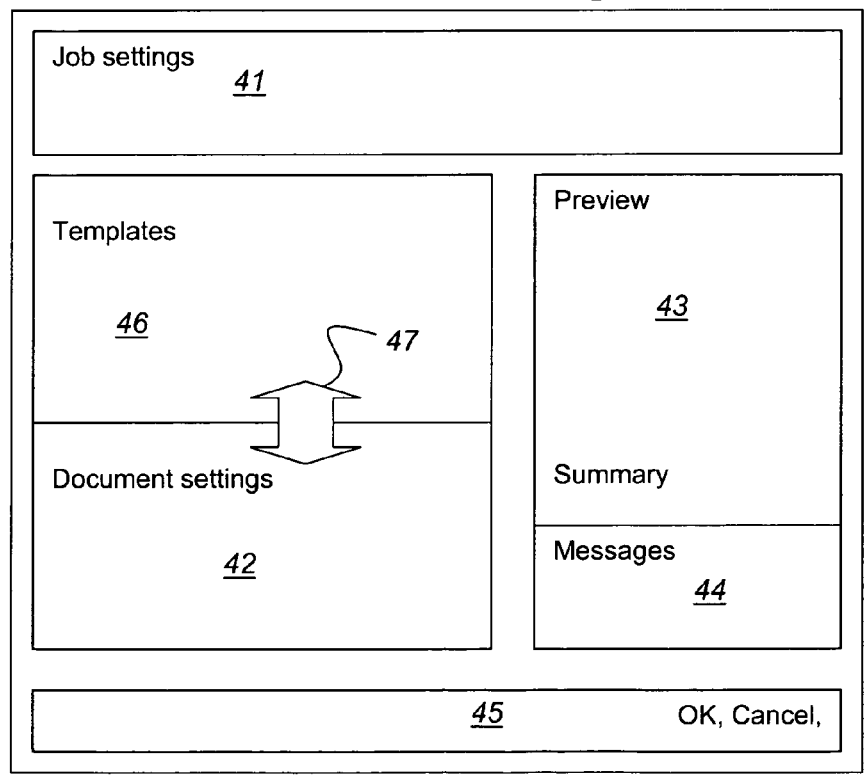
FIG. 4 shows a schematic setup of the same window.

The "Job" tab sheet 32 is more schematically shown in FIG. 4, and includes the following fields:

Job settings (41). Here the user can define settings that affect the workflow of the job, and do not affect the printed document. The settings are <number of copies>, <job name>, <mailbox> and <security>. If "mailbox" is checked, print jobs are not immediately printed upon reception at the printer, but wait there for selection and subsequent starting by an operator at the printer console. If "security" is checked, the user is prompted for a code string. The job is then also not immediately printed, and can only be started at the printer console by entering the code string.

Document settings (42). In this field settings can be specified that do affect the printed document. For the convenience of the users, the settings are arranged in a number of collapsible groups to make them easily available.

In an exemplary embodiment, the following groups are defined:

Layout

The settings in this group describe how the pages of the document should look like. Here one can choose the orientation of the pages, whether the document is 1-sided or 2-sided, and define the position of the binding edge and the margin shift. If a user wants to have 2 pages printed on one sheet or wants the document to look like a booklet, she can also find the relevant settings in this group.

Paper

The settings in this group describe on which paper the document should be printed. Here one can choose the size (e.g., A4 or 8½" by 11") and the paper type for the document, but the user can also define a different paper type for the front and back cover. From here a Page Programming tool can be activated to define sets of different paper types within a document.

Finishing

The settings in this group describe how the document should be bound and delivered at the printer. Here one can choose the staple option, the output bin of the printer, or specify that copies be collated or not.

Image

The settings in this group describe how the content of the pages should look like on the printed product. Here one can select rough or fine image quality, put a watermark across the content of the document, mirror the image or invert the image.

Accounting

The settings in this group allow a user to provide personal accounting information for the prints. This will be further explained below.

Figure 5:
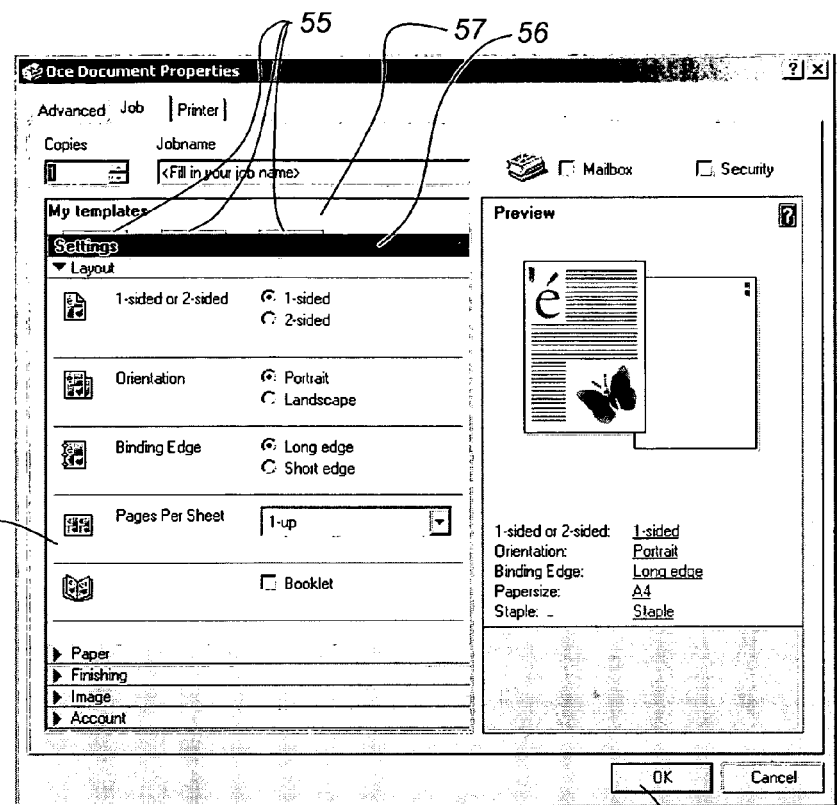
FIG. 5 shows another view of the job specification window.

In FIG. 3, the settings groups are all in the collapsed state. By clicking the arrow triangle in the Settings bar, one of the groups explodes. This is shown in FIG. 5 for the Layout group. The described embodiment of groupings and settings is to be considered merely an example of a preferred embodiment, and many other embodiments will be apparent to a person skilled in the art.

Continuing the fields of the "Job" tab sheet 32:

Preview and Summary (43). As discussed above, the number of settings can be very large. Most users will only use a small portion of all these settings, and most settings will only be changed occasionally.

To accommodate for this, the driver will show a summary, containing the most commonly used settings (and their value) for that printer, which provide a direct access to these settings.

The structure of the summary items is:

<Setting name> [Setting value]

Clicking the [Setting value] will open the relevant group in the settings field 42.

The preview shows graphically the settings (as far as possible) made or accepted by the user.

Message area (44). Below the summary, an area is reserved for relevant messages from the system to the user. These are error, contradiction or supplies related messages. For example, when a user selects settings that are mutually exclusive (or at least not logically combinable), a summarizing message appears in field 44 together with an "Undo" button for undoing the last, conflicting selection. One example of such a situation is, when a user selects single sided-printing and "Booklet imposition" (settings shown in FIG. 5), which is an illogical combination, the system automatically changes "1-sided" into "2-sided" in the settings field, places an attention sign close to the changed setting, and shows a message summarizing the automatic change in the message field 44, together with an "Undo" button for the "Booklet" selection.

An area (45) at the bottom of the driver window (in this embodiment, outside the "Job" tab sheet) is reserved for Windows' OK and Cancel buttons.

Templates (46). A template is defined as a coherent set of setting-defaults describing a print job. A template is based on capabilities of a specific printer or printer type. It allows the user to define a print job in a quick and efficient way by simply clicking a corresponding icon in the Templates field 46.

A template is automatically created every time the user selects an already-existing template, changes one or more of its settings, and confirms the change(s) by clicking the "OK" button in area 45. A new template, containing these new setting(s), is automatically added to the list, and is given the following name: Template {n} (where n is an integer).

Each time a new template is created, it is assigned the following available number (n+1). As long as there are numbered templates in the Template view 46, each new template gets a number higher than the highest existing one. If the user renames or deletes the numbered templates so that there are no numbers left (n=0), the system starts with 1 again. Also, other naming conventions are contemplated, e.g., including a date/time stamp or including the name of the document file for which it is created.

Once created, a template does not change. The template cannot be edited, except for its name. The name is changed by using the contextual menu ("double click") option "Rename".

A template can be deleted by the user, depending on location and situation. In one embodiment of the invention, templates that are not renamed within a predetermined time period, e.g., a day, are automatically deleted under the presumption that a template is obviously not intended to be saved when its creator does not take the effort to make it recognizable by renaming it. Also, a template may be automatically deleted when it has not been used during a (possibly user-programmable) predetermined time.

However, a further embodiment of the invention has one or more templates being defined as undeletable by the system administrator, such as the "Standard" template shown in FIG. 3. This latter feature provides a route to impose "company defaults". Undeletable templates may be shown with an added padlock icon in the Templates field 46.

In order to prevent the number of templates from growing uncontrollably, in an embodiment of the invention, the number of newly-created templates is maximized at a predetermined value N, on a first in-first out (FIFO) basis. This means that, when a new template would get the number N+1, the oldest new template is automatically deleted. The number N would typically be low, otherwise, a user would not be able to remember what the new templates were used for.

In one preferred embodiment, N is equal to 1. In many cases, a user changes the settings of the print process and then clicks the "OK" button of the printer driver. In reaction, the print job is submitted to the printer and the printer driver window disappears. Normally, that is the moment the user realises that he wanted to keep those settings for a further print job. It would be very handy, if those settings would be recoverable, and the present invention provides a method accomplishing this by defining a "last used" template for the user to recall. For those situations, a value of N=1 would be sufficient. In yet another embodiment, the value of N is configurable for the user, such that he can make the system behave in the way he prefers.

In a further embodiment, the new templates can be taken out of the FIFO queue by an explicit save action of the user. Those templates are then made permanent and remain selectable for the user. Renaming a template (as described hereinabove) automatically saves a template into a permanent state. Other ways of making a new template permanent, such as an explicit "Save" option, either in a pop-up menu as described below with reference to FIG. 6, or in the form of a dedicated key in the printer driver window, are also contemplated by the inventors.

A template can be created on 2 locations: in the driver launched from the printing preferences (via Windows Start menu), and in the printer driver launched from an application (e.g., MS Word). However, the invention is not restricted to MS applications.

A template is represented in the Templates field 46 by an icon and a name. The icon is dynamic and is a smaller representation of the Preview. A limited number of the settings represented by the template can be recognized in the icon. When a template is selected, the preview of the result is displayed in the Preview section. A template displays a tool tip with its full name and its creation date/time.

Figure 6:
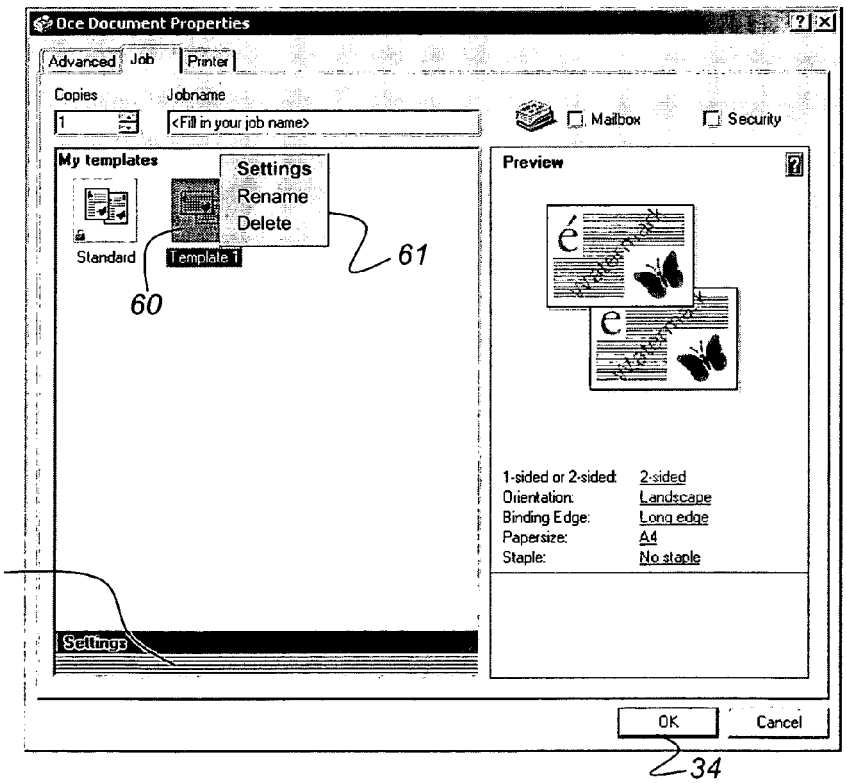
FIG. 6 shows another view of the job specification window.

Double-clicking the template object opens the Settings field 42 as shown in FIG. 5. On the click of the right mouse button, a contextual menu 61 is opened tiled over the template icon (60), as shown in FIG. 6. This menu contains the following options: Settings (opens the Settings field 42 for redefining settings), Rename (for changing the name as presented in the Templates field 46 and automatically saving as a permanent template), and Delete (for deleting a template, in order to prevent the number of templates from becoming excessive, and to eliminate non-functional and no-longer used templates). In addition, although not shown in FIG. 5, the menu may include a "Save" option for making the template permanent.

Using these options, a user can easily adapt the template mechanism to his requirements and wishes.

Templates can have four states: enabled, enabled-locked, disabled and disabled-locked. When a template is disabled, it cannot be used (the print button does not work). Disabling may, e.g., be user-dependent. When a template is locked, the user cannot delete this template.

FIG. 4 shows the Templates field 46 and the Settings field 42 sharing one space in the printer driver window, as represented by an arrow 47. For handling templates, the settings field is collapsed, and this is also the normal view when the driver window is opened. When the settings field is opened, a small strip of the templates (55) remains visible, to avoid the possibility that the user cannot retrieve the templates, as can be seen in FIG. 5. The settings can be closed by either clicking on the Settings bar 56 or clicking on the small part (57) of the templates area that is still visible.

After having selected a template and possibly having changed one or more of the settings therein, the user may now click the "OK" button 34 (FIG. 3) in the lower right corner of the driver window to confirm the settings (this action automatically creates a new template, as explained above), return to the (Windows) print service, and activate the print command.

Figure 11:
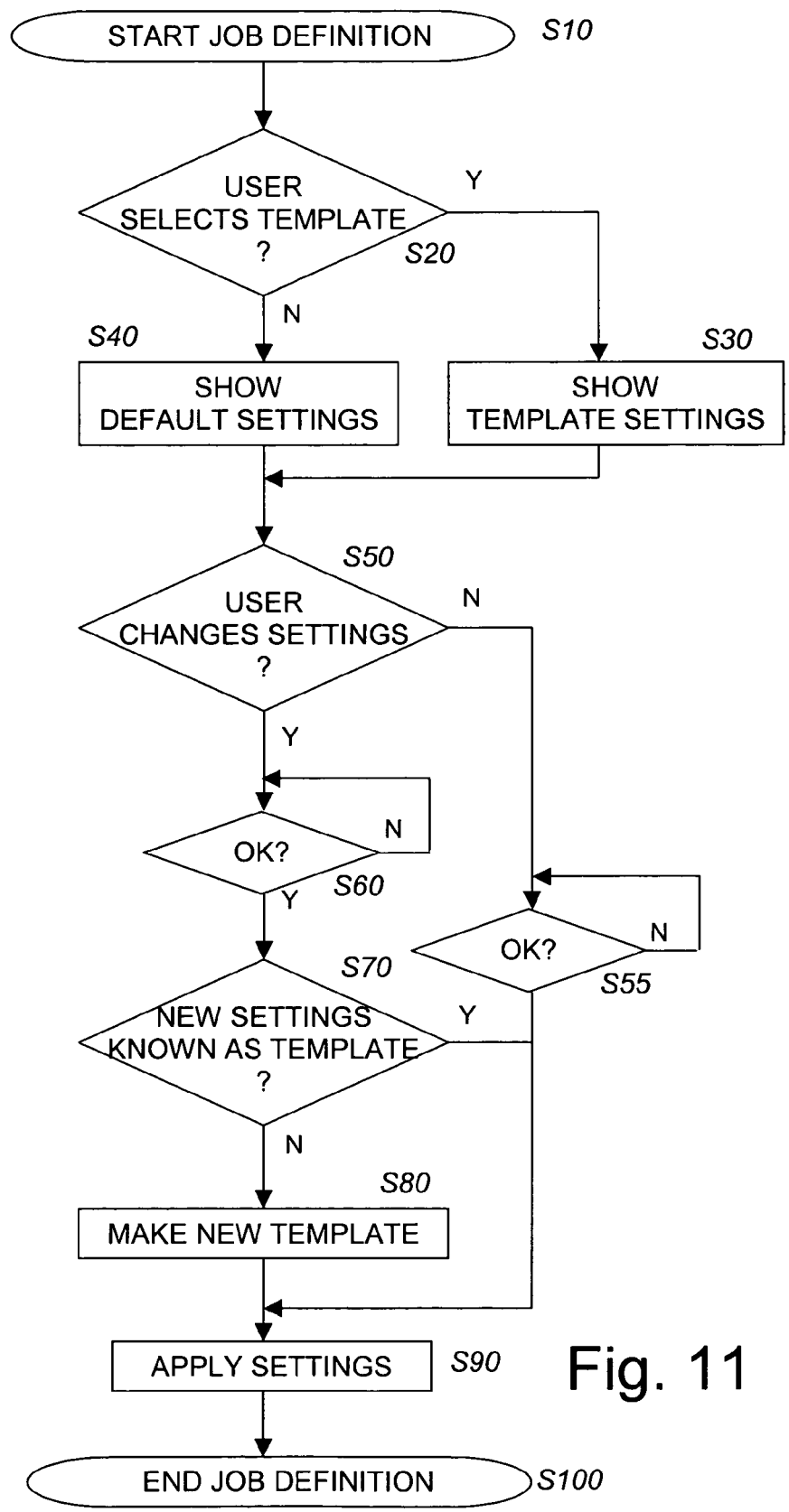
FIG. 11 shows a flow chart of a process of using and generating templates in a print job definition process according to the present invention.

The process of using and generating templates in a print job definition process is now summarized with reference to FIG. 11.

In step S10, the user enters the user interface window of the printer driver, and more specifically the tab sheet "Job" (32) thereof. In order to define the print job, the user may now select a template or, by not selecting, accept the present default template (which may in one embodiment of the invention be the "standard" template, and in another embodiment of the invention be the template used in the last previous print job), step S20, and the system shows the momentary choice (S30 or S40). Next, the system checks in step S50 whether the user made changes to the presently shown settings.

If the user is satisfied with the present settings and clicks the "OK" button 34 without changes (S55), the system applies the settings (S90) and leaves the job definition phase in S100.

If the user does change the settings (and confirms the changes by clicking the "OK" button 34, S60), the system checks in step S70 whether the newly defined set of setting values is already known as a template. If not, the system makes a new template under the default name "Template n", which may later be changed by the user, and makes it available for selection in a following print job definition process (S80). Thereafter, the system applies the new settings (S90) and leaves the job definition phase in S100.

Figure 12:
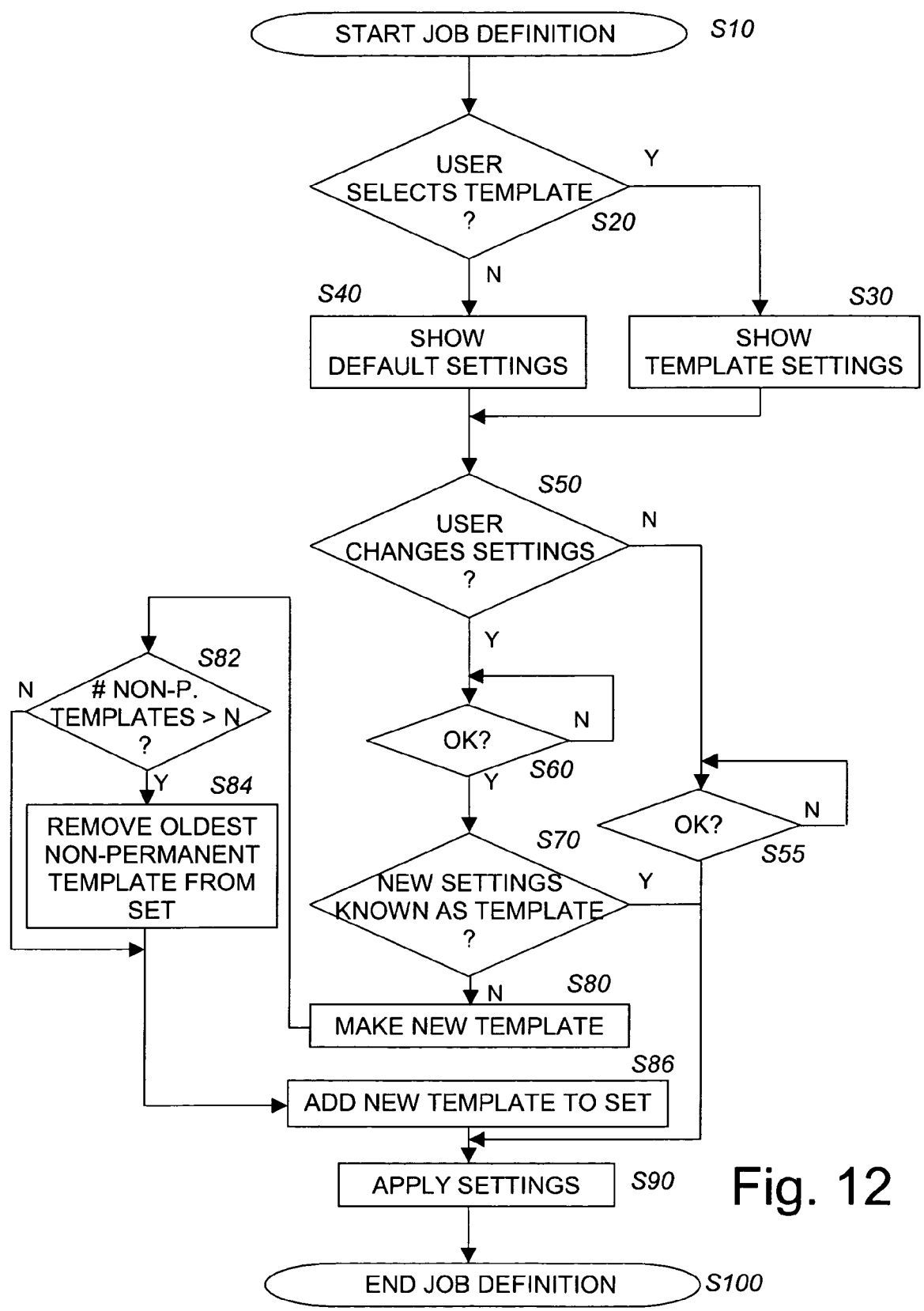
FIG. 12 shows a flow chart of a process of using and generating templates according to another embodiment of the invention.

FIG. 12 shows an alternative process, wherein the number of newly-defined templates is maximized to a number of N as described hereinbefore. In this embodiment, a template is non-permanent (as defined above) unless it is explicitly saved or renamed.

In step S10, the user enters the user interface window of the printer driver, and more specifically the tab sheet "Job" (32) thereof. In order to define the print job, the user may now select a template or, by not selecting, accept the present default template (which may in one embodiment be the "standard" template and in another embodiment the template used in the last previous print job), step S20, and the system shows the momentary choice (S30 or S40). Next, the system checks in step S50 whether the user makes changes to the presently shown settings.

If the user is satisfied with the presently presented settings and clicks the "OK" button 34 without changes (S55), the system applies the settings (S90) and leaves the job definition phase in S100.

If the user does change the settings (and confirms the changes by clicking the "OK" button 34, S60), the system determines in step S70 whether the newly defined set of setting values is already known as a template. If not, the system makes a new template (S80) under the default name "Template n", which may later be changed by the user.

Next, in step S82, the system determines if the new template would bring the number of non-permanent templates at a value larger than N. If so, the system automatically deletes the oldest non-permanent template (S84) and adds the new template to the set of selectable templates (S86). The remaining templates may now be renumbered from 1 to N in the display window (Templates field 46 of FIG. 4). Alternatively, the template numbers shown keep counting up, or renumbering may only be done at a command of the user or upon start-up of the PC. Thereafter, the system applies the new settings (S90) and leaves the job definition phase in S100.

Although the invention described above has a change of each and every settings value leading to a new template, it is also within the scope of the invention to limit the effect of defining a new template for changes within a limited group of the settings. For example, a change of the number of copies could well be a change that does not define a new template. Furthermore, the invention also includes an embodiment in which, before a new template is created, the system first checks if the combination of settings values already exists as a template, and, if so, it does not create a new template. This check may also be limited to the above-mentioned predetermined group of settings.

Templates can in principle be exported to other printer drivers, such that a user does not have to formulate a new template for each printer he can print to.

Figure 7:
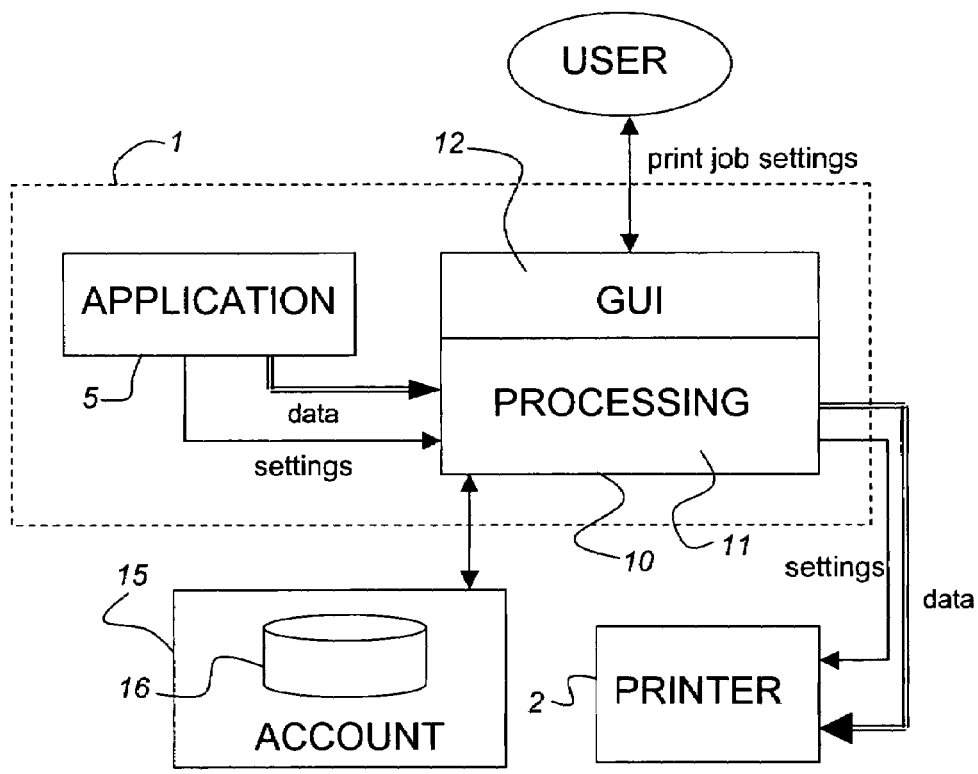
FIG. 7 shows a schematic functional view of a system according to another embodiment of the present invention.

A special application of the settings mechanism will now be explained for the case when a user works for several different accounts and has to assign print jobs to either one of those. In this situation, the overall system may include an accounting application 15 having a database 16 of accounting details, as shown in FIG. 7. The accounting application connects to the printer driver for exchanging accounting information and to the printer 2 for receiving information concerning the actual print process.

Figure 8:
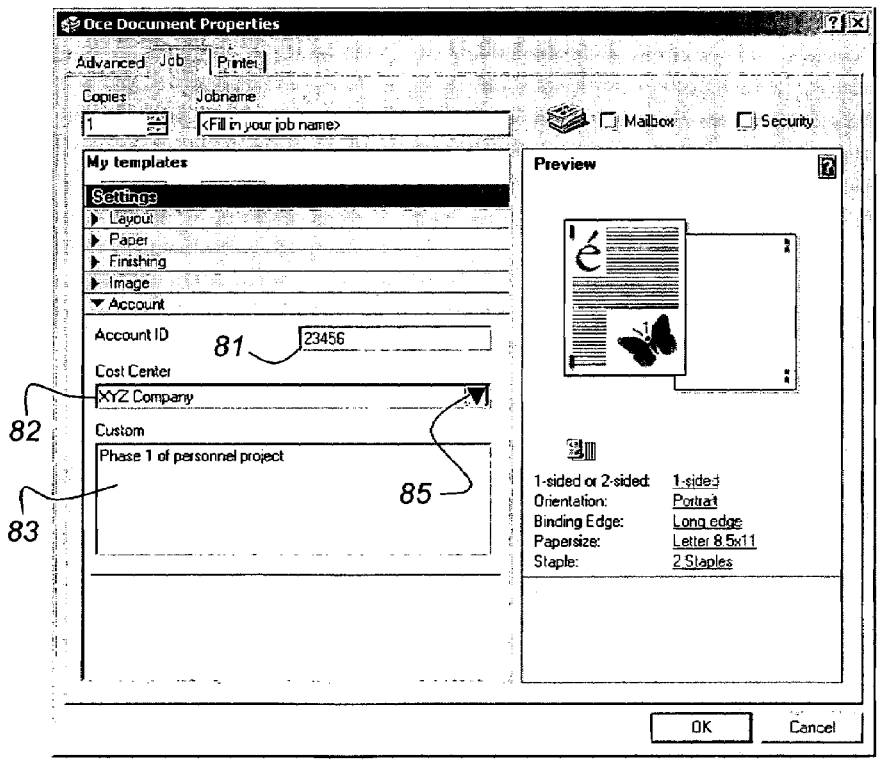
FIG. 8 shows another view of the job specification window.

FIG. 8 shows a printer driver window with the Settings field opened for the Account settings. FIG. 8 applies to a user, printing on a basic account having an exemplary account ID number "23456" as entered in the Account ID field 81. The account may be a personal account or a department account or other, when working for multiple clients, for whom separate cost totals must be kept. The particular client can be selected in the "Cost Center" field 82, in this example "XYZ Company". In one embodiment of the invention, the printer driver, in reaction to entry of a particular account number, queries the accounting application 15 for account entries assigned to that account number, e.g., client names, and then presents a pick (selection) list of clients in the "Cost Center" field, based on the information stored in the database 16 for that particular account number. The user may inspect the pick list by clicking the button 85 at the right end of the "Cost Center" field, and select one of the entries.

In another embodiment of the invention, a reference may simply be typed in the "Cost Center" field 82 without intervention of the accounting application 15.

When a user actually commands the print job, the information (including the account number and the "Cost Center" information) is transmitted to the accounting application 15. Then, when the printer actually prints the job, print process data is sent to the accounting application 15, which calculates the costs and stores them in the database 16.

When the user works on several different projects for one client, corresponding separate accounts may be stored in the database 16. Alternately, one account may be used, and additional information entered in the "Custom" field 83. This additional information is also reported to the accounting application 15 each time a print job is commanded.

Figure 9:
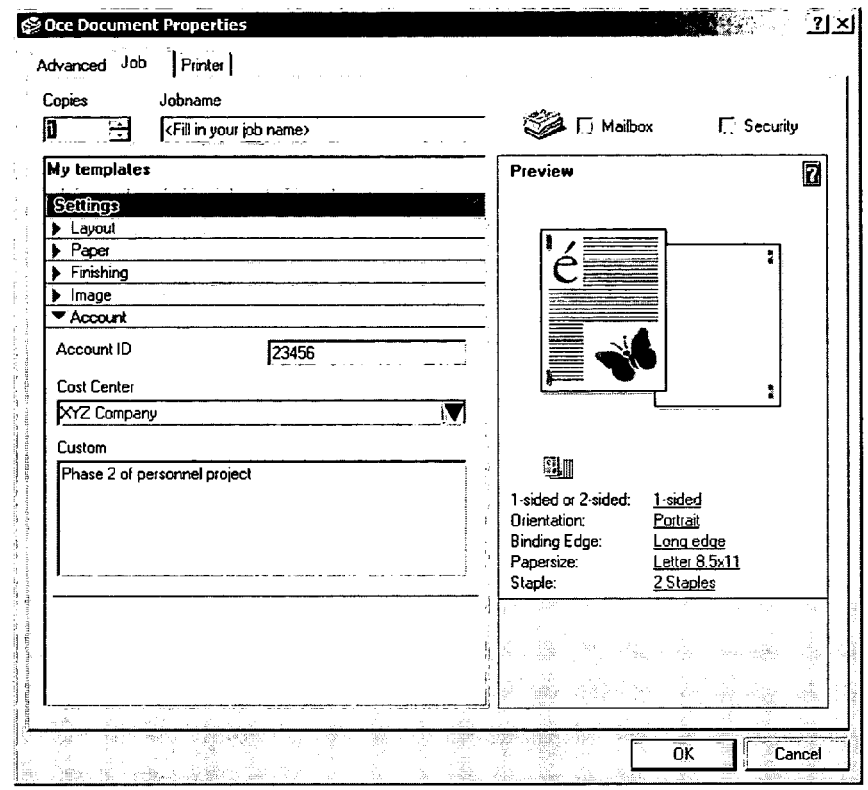
FIG. 9 shows another view of the job specification window.
Figure 10:
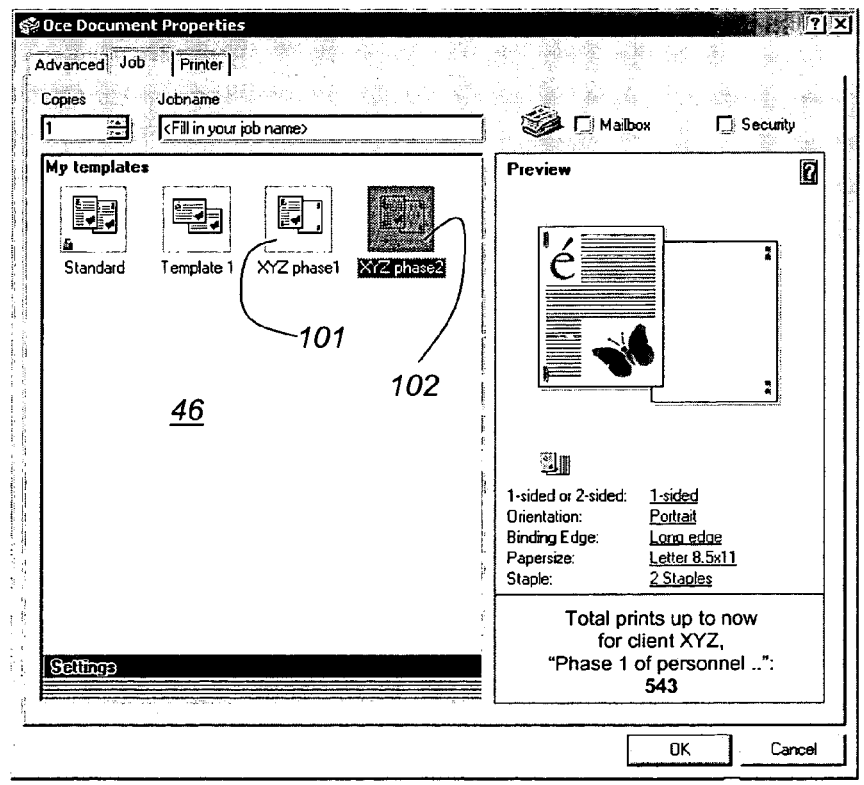
FIG. 10 shows another view of the job specification window.

Every different entry in any of the fields 81, 82 or 83 gives rise to a new template in the template field 46, even if all of the other settings are equal, as is shown in the sequence of FIGS. 8, 9 and 10. In FIG. 10, the two templates defined in FIGS. 8 and 9, are shown as the two rightmost templates (101, 102) in the Template field 46. As can be seen, the user has renamed them in order to recognize them.

In a further embodiment of the invention, the printer driver may query the accounting application 15 for information on the account or sub-account selected by the user. Such information would then preferably be presented in the Message field 44, and could include total accumulated costs up to that moment, special preferences of the client, etc.

Although the invention has been demonstrated for MS applications, the invention is not restricted to MS applications, and any appropriate platform can be used, such as Apple, Unix, Linux, etc. Also the invention is not restricted to printers, and the invention can also be applied to other appropriate output devices, such as fax machines.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

The invention claimed is:

1. A method of printing documents from a user workstation, comprising:
    activating a printer driver for submitting a digital document file to a printer;
    specifying print process settings in the printer driver such that values of settings are either individually or collectively specified, a collective specification being a selection of a user-selectable prestored set of settings, said collective specification being a template; and
    commanding the driver to submit the document file and the settings to the printer,
    wherein each time a value of at least one of a predetermined set of settings is individually specified and confirmed by a user, a new template is automatically defined and made selectable in the printer driver,
    wherein the new template is automatically saved and made selectable in the printer driver without intervention of the user.

2. The method according to claim 1, wherein a new template is not defined if it does not differ, in said predetermined set of settings, from an already existing template.

3. The method according to claim 1, wherein an individual specification of a setting value comprises changing said value in the template.

4. The method according to claim 1, which further comprises allowing a user to define a name for the template.

5. The method according to claim 1, which further comprises allowing a user to delete a template.

6. The method according to claim 1, wherein at least one pre-defined template can never be deleted by a user.

7. The method according to claim 1, which further comprises presenting templates in a selection window on the workstation display screen.

8. The method according to claim 1, which further comprises presenting a summary of values of a plurality of settings in accordance with a selected template in a window on the workstation display screen.

9. The method according to claim 1, which further comprises presenting a summary of values of a plurality of settings in accordance with currently specified settings in a window on the workstation display screen.

10. The method according to claim 1, wherein a new template is made permanent by a save action of the user.

11. The method according to claim 10, wherein a maximum number N of new templates that have not been made permanent by the user is maintained in a first in-first out basis.

12. The method according to claim 11, wherein $N<4$.

13. The method according to claim 11, wherein N is 1.

14. The method according to claim 11, wherein N is a configurable value, settable by a user.

15. A printer driver for use in a workstation such as a PC for printing document files to a printer, comprising
    a data processing section for processing document data and submitting the processed document data to a printer; and
    a graphical user interface section for communication with a user by presenting information on the display screen of the workstation,
    said printer driver being laid out for implementing the method according to claim 1.

16. A computer-readable medium carrying computer code implementing the method according to claim 1.

17. The method according to claim 1, wherein templates are automatically deleted after a predetermined time interval of non-use by a user.

18. A method for controlling a document-related process from a user workstation, comprising:
    activating in the workstation a driver for said document-related process;
    specifying process settings for said document-related process in the driver such that values of settings are either individually or collectively specified, a collective specification being a selection of a user-selectable prestored set of settings, said collective specification being a template; and
    commanding the driver to start the document-related process using the specified settings,
    wherein each time a value of at least one of a predetermined set of settings is individually specified and confirmed by a user, a new template is automatically defined and made selectable in the driver,
    wherein the new template is automatically saved and made selectable in the printer driver without intervention of the user.

19. The method according to claim 18, wherein a new template is not defined if it does not differ, in said predetermined set of settings, from an already existing template.

20. The method according to claim 18, wherein an individual specification of a setting value comprises changing said value in the template.

21. The method according to claim 18, which further comprises allowing a user to define a name for the template.

22. The method according to claim 18, which further comprises allowing a user to delete a template.

23. The method according to claim 18, wherein at least one pre-defined template can never be deleted by a user.

24. The method according to claim 18, which further comprises presenting templates in a selection window on the workstation display screen.

25. The method according to claim 18, which further comprises presenting a summary of values of a plurality of settings in accordance with a selected template in a window on the workstation display screen.

26. The method according to claim 18, which further comprises presenting a summary of values of a plurality of settings in accordance with currently specified settings in a window on the workstation display screen.

27. The method according to claim 18, wherein said document-related process is a print process in a printer connected to the workstation.

28. The method according to claim 18, wherein said document-related process is a print process through intermediary print server action.

29. The method according to claim 18, wherein said document-related process is a document image transfer process, such as a facsimile transmission.

30. The method according to claim 18, wherein said document-related process is a scan process in a scanner connected to a workstation and controlled from the workstation.

31. The method according to claim 1.8, wherein a new template is made permanent by a save action of the user.

32. The method according to claim 18, wherein templates are automatically deleted after a predetermined time interval of non-use by a user.

33. A method for controlling a document-related process from a user workstation, comprising:

activating in the workstation a driver for said document-related process;

specifying process settings for said document-related process in the driver such that values of settings are either individually or collectively specified, a collective specification being a selection of a user-selectable prestored set of settings, said collective specification being a template; and commanding the driver to start the document-related process using the specified settings, wherein each time a value of at least one of a predetermined set of settings is individually specified and confirmed by a user, a new template is automatically defined and made selectable in the driver, wherein a new template is made permanent by a save action of the user, and wherein a maximum number N of new templates that have not been made permanent by the user is maintained in a first in-first out basis.

34. The method according to claim 33, wherein N<4.

35. The method according to claim 33, wherein N is 1.

36. The method according to claim 33, wherein N is a configurable value, settable by a user.

* * * * *